United States Patent
Radtke et al.

(10) Patent No.: US 6,944,548 B2
(45) Date of Patent: Sep. 13, 2005

(54) FORMATION EVALUATION THROUGH AZIMUTHAL MEASUREMENTS

(75) Inventors: Richard J. Radtke, Pearland, TX (US); Michael L. Evans, Missouri City, TX (US); Robert A. Adolph, Houston, TX (US); Loïc Vildé, Lawrence Avenue, NJ (US); Nihal Ian Wijeyesekera, Dubai (AE)

(73) Assignee: Schlumberger Technology Corporation, Sugar Land, TX (US)

( * ) Notice: Subject to any disclaimer, the term of this patent is extended or adjusted under 35 U.S.C. 154(b) by 294 days.

(21) Appl. No.: 10/331,747

(22) Filed: Dec. 30, 2002

(65) Prior Publication Data

US 2004/0128073 A1 Jul. 1, 2004

(51) Int. Cl.[7] ............................... G01V 5/10
(52) U.S. Cl. ........................................ 702/8
(58) Field of Search ................. 702/8, 10; 73/152.02, 73/152.05, 152.06; 250/269.4, 269.5, 269.6, 269.8, 269.2

(56) References Cited

U.S. PATENT DOCUMENTS

| | | |
|---|---|---|
| 4,698,501 A | 10/1987 | Paske |
| 4,879,463 A | 11/1989 | Wraight et al. |
| 4,972,082 A | 11/1990 | Loomis et al. |
| 5,017,778 A | 5/1991 | Wraight |
| 5,091,644 A | 2/1992 | Minette |
| 5,235,185 A | 8/1993 | Albats et al. |
| 5,397,893 A | 3/1995 | Minette |
| 5,473,158 A | 12/1995 | Holenka et al. |
| 5,539,225 A | 7/1996 | Loomis et al. |
| 5,804,820 A * | 9/1998 | Evans et al. .............. 250/269.6 |
| RE36,012 E * | 12/1998 | Loomis et al. ........... 250/269.4 |
| 6,032,102 A * | 2/2000 | Wijeyesekera et al. ........ 702/8 |
| 6,167,348 A * | 12/2000 | Cannon ........................ 702/13 |
| 6,307,199 B1 * | 10/2001 | Edwards et al. .......... 250/269.3 |
| 2002/0036260 A1 * | 3/2002 | Adolph .................... 250/269.1 |
| 2002/0096363 A1 * | 7/2002 | Evans et al. ................... 175/41 |
| 2002/0153481 A1 * | 10/2002 | Stoller et al. ................ 250/266 |
| 2003/0101806 A1 * | 6/2003 | Kurkoski .................. 73/152.02 |
| 2003/0122067 A1 * | 7/2003 | Radtke et al. ............ 250/269.3 |

FOREIGN PATENT DOCUMENTS

| | | |
|---|---|---|
| GB | 2349947 | 11/2000 |
| GB | 2371620 | 7/2002 |

* cited by examiner

*Primary Examiner*—Donald McElheny Jr.
(74) *Attorney, Agent, or Firm*—Victor H. Segura; Brigitte L. Jeffrey; John Ryberg

(57) ABSTRACT

A method for formation logging includes acquiring measurements of neutron-induced signals having azimuthal information using a neutron tool; processing the measurements into a plurality of azimuthal sector data for each acquisition interval; and deriving a selected parameter from the plurality of azimuthal sector data. A logging tool includes a housing adapted to move in a borehole; a circuitry having memories for storing neutron-induced measurements; a neutron source disposed in the housing; and at least one detector bank disposed in the housing spaced apart from the neutron source, wherein each of the at least one detector bank comprises at least one detector disposed around a periphery of the housing such that the at least one detector is more sensitive to signals from an azimuthal direction, and wherein count rates detected by each of the at least one detector are separately stored in the memories.

23 Claims, 6 Drawing Sheets

FORMATION EVALUATION THROUGH AZIMUTHAL MEASUREMENTS

BACKGROUND OF THE INVENTION

1. Field of the Invention

The present invention relates to the field of well logging. More specifically, the present invention relates to apparatus and methods for well logging using neutron tools.

2. Background Art

In traditional wireline (WL) well logging, a sonde is lowered into a borehole and data are collected as the tool is pulled uphole. The detectors in the sonde therefore make measurements as a function of depth or acquisition time, and the precise location of the detectors with respect to the circumference of the borehole at each depth or acquisition time, i.e., the azimuthal position, is generally disregarded. Measurements are typically recorded as a function of acquisition time (temporal intervals) and are later converted to measurements as a function of depth of the well (axial depth; spatial intervals). In this description, "acquisition intervals" are generally used to refer to either spatial or temporal intervals, i.e., the "depth" (or "axial depth") of a well or the "acquisition time." Notable exceptions include formation micro-scanners such as those disclosed in U.S. Pat. No. 4,468,623 issued to Gianzero et al. One example of a formation micro-scanner is that under the trade name of formation micro-imager (FMI™) from Schlumberger Technology Corp. (Houston, Tex.). The sonde of a formation micro-scanner forces several articulated pads against the borehole wall to measure the formation resistivity as a function of depth and azimuth. The resulting data may be used to construct a formation image. They provide detailed and valuable information about the formations that are otherwise unavailable, such as the direction and inclination of dipping beds.

With measurement-while-drilling (MWD) or logging-while-drilling (LWD), a tool usually rotates with the drill string, and, therefore, the detectors in the tool sweep through the circumference of the borehole many times at each depth level. One example of an LWD nuclear measurement tool is that under the trade name of ADN™ from Schiumberger Technology Corp. (Houston, Tex.). This tool can record gamma density and neutron data as a function of tool orientation. If the measurements are well-focused, then the measurement data can be used to build an image of the borehole. In the field of nuclear measurements, gamma ray data are more focused. Therefore, azimuthal nuclear logging traditionally involves gamma density measurements. In contrast, neutron measurements are usually considered unfocused and have not been used for formation imaging.

The use of azimuthal sectors to improve gamma density data analysis is disclosed in U.S. Pat. No. 5,091,644 issued to Minette. This patent describes a method for analyzing gamma density data from an MWD logging tool. According to this method, the received gamma ray signals are binned into a plurality of sectors, typically four sectors: bottom, top, left, and right. The binning divides the data into four azimuthal sector data for each detector. The relative errors of the four azimuthal sector data are compared. The method then selects a specific azimuthal data that has the least error as an optimum measurement. Alternatively, the method combines measurements from two or more sectors to produce an optimum measurement.

U.S. Pat. No. 5,397,893 issued to Minette describes a similar method that can be used to separate gamma density data into a number of bins (sectors) based on the amount of standoff. Then, these density measurements are combined in a manner that minimizes the total error in the density calculation.

U.S. Pat. No. 5,473,158 issued to Holenka et al. discloses methods and apparatus for measuring formation characteristics as a function of azimuthal angles using neutron, gamma, and ultrasonic devices. This patent is assigned to the same assignee as the present invention and is hereby incorporated by reference. In a method according to this patent, neutron data are measured as a function of quadrants in a conventional manner. The bottom point where the tool presumably contacts the borehole wall is then identified using the angular position sensors provided in the tool. The measurements in the bottom quadrant are presumed to have relatively less error and are more representative of the formation properties. Thus, the methods of Holenka may be used to select data from the "bottom" sectors as representative of formation properties. However, these methods cannot provide formation images from the neutron measurements.

Because formation images may provide information that is otherwise unavailable from conventional neutron measurements, it is desirable to have methods and apparatus that permit azimuthal neutron measurements that can be used to provide formation images.

SUMMARY OF INVENTION

An aspect of the invention relates to methods for formation logging using neutron tools having azimuthal sensitivities. A method for formation logging includes acquiring measurements of neutron-induced signals having azimuthal information using a neutron tool in a borehole; processing the measurements into a plurality of azimuthal sector data for each acquisition interval; and deriving a selected parameter from the plurality of azimuthal sector data. The processing of the measurements into a plurality of azimuthal sector data may be based on the fraction of time a particular detector spends in a particular sector.

Another aspect of the invention relates to logging tools having azimuthal sensitivities. A neutron logging tool includes a housing adapted to move in a borehole; circuitry having memories for storing measurements of neutron-induced signals; a neutron source disposed in the housing; and at least one bank of detectors disposed in the housing spaced apart from the neutron source along an axis of the logging tool, wherein each of the at least one bank of detectors comprises a plurality of detectors disposed around a periphery of the housing such that the plurality of detectors are more sensitive to signals from an azimuthal direction, and wherein count rates detected by each of the plurality of detectors are separately stored in the memories.

Other aspects and advantages of the invention will be apparent from the following description and the appended claims.

DETAILED DESCRIPTION

Embodiments of the invention relate to methods and apparatuses for logging and imaging earth formations using neutron tools. The logging techniques are based on improved neutron tools with the ability to detect neutron data having azimuthal information. Specifically, embodiments of the invention relate to methods for azimuthal measurements of neutron-induced signals and methods for analyzing these measurements. Methods of the invention make it possible to improve the accuracy of these measurements, to provide image-based analysis of neutron-induced signals, and to provide additional information previously unavailable to neutron logging. Embodiments of the invention may be applied to measurements in wireline, MWD/LWD, or logging-while-tripping (LWT) environments. In addition, embodiments of the invention may be combined with other measurements for analysis.

Azimuthal acquisition of neutron-induced signals may be achieved in several ways. In an LWD tool, for example, the azimuthal acquisition may be achieved by allowing the tool to sweep around the borehole. The azimuthal sensitivity of the measurement may be aided by shielding and collimation around the detector and/or the neutron source. A method of determining the orientation of the tool in the borehole, such as that disclosed in U.S. Pat. No. 5,473,158 issued to Holenka et al., can then be used to group data from specific azimuthal regions, generally called sectors, together. Alternatively, azimuthal acquisition may be achieved by employing multiple detectors with different radial and/or axial spacings relative to the tool axis. In this case, azimuthal data acquisition can occur even if the tool is not rotating. The azimuthal data can be used to derive formation properties such as porosity, hydrogen index, sigma, pulsed-neutron density, slowing-down time, spectroscopy, and salinity.

Figure 1:
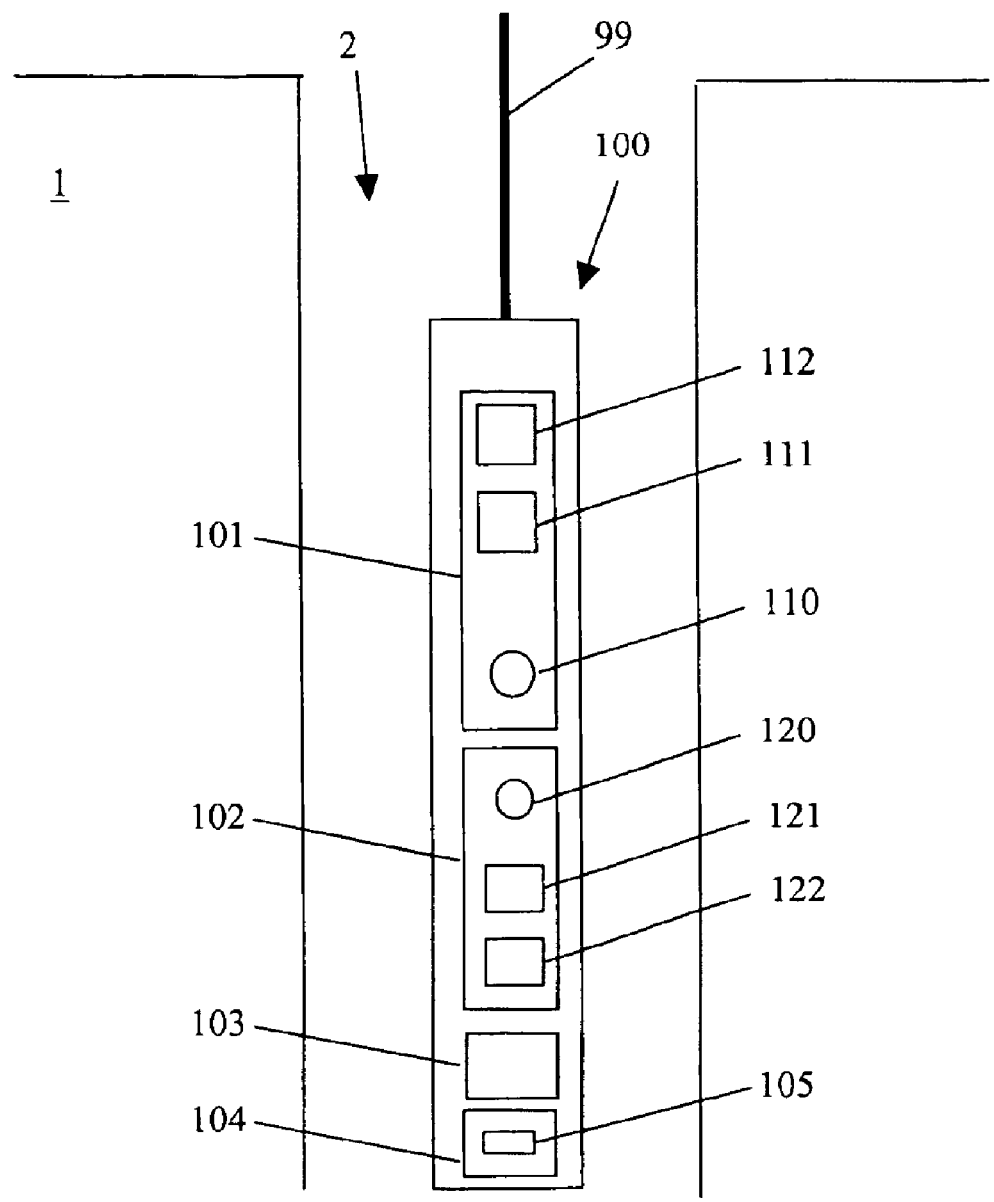
FIG. 1 shows a logging tool according to one embodiment of the invention disposed in a borehole penetrating a formation.

FIG. 1 illustrates a logging tool 100, according to one embodiment of the invention, disposed in a borehole 2 that penetrates an earth formation 1. The logging tool 100 is suspended in borehole 2 via a cable 99, which may be a wireline or a drilling string (for LWD or MWD tools). The logging tool 100 can be configured to log any neutron-induced signals, e.g., neutron signals, gamma ray signals, and/or X-ray signals. These neutron-induced signals may be used to provide real-time or recorded apparent neutron porosity, formation bulk density, and photoelectric factor data to characterize formation porosity and lithology while drilling.

As illustrated in FIG. 1, the logging tool 100 may comprise a neutron tool 101, a gamma ray tool 102, and an ultrasonic device 103. In addition, it includes a circuitry 104 for controlling the operation of various devices on the logging tool 100. The circuitry 104 may include one or more memories 105 for storing the measurement data and/or programs for data analysis. The relative positions (arrangements) of these individual devices and the number of devices on the logging tool 100 are not important and should not limit the scope of the invention.

As shown in FIG. 1, the neutron tool 101 of the logging tool 100 comprises a neutron source 110, a near neutron detector bank 111, and a far neutron detector bank 112. While neutron tools typically have two banks of detectors (near and far), one of ordinary skill in the art would appreciate that the precise number of detectors is not important for embodiments of the invention and should not limit the scope of the invention. The neutron source 110 may be a chemical neutron source (e.g., AmBe) or a pulsed neutron generator.

Figure 2:
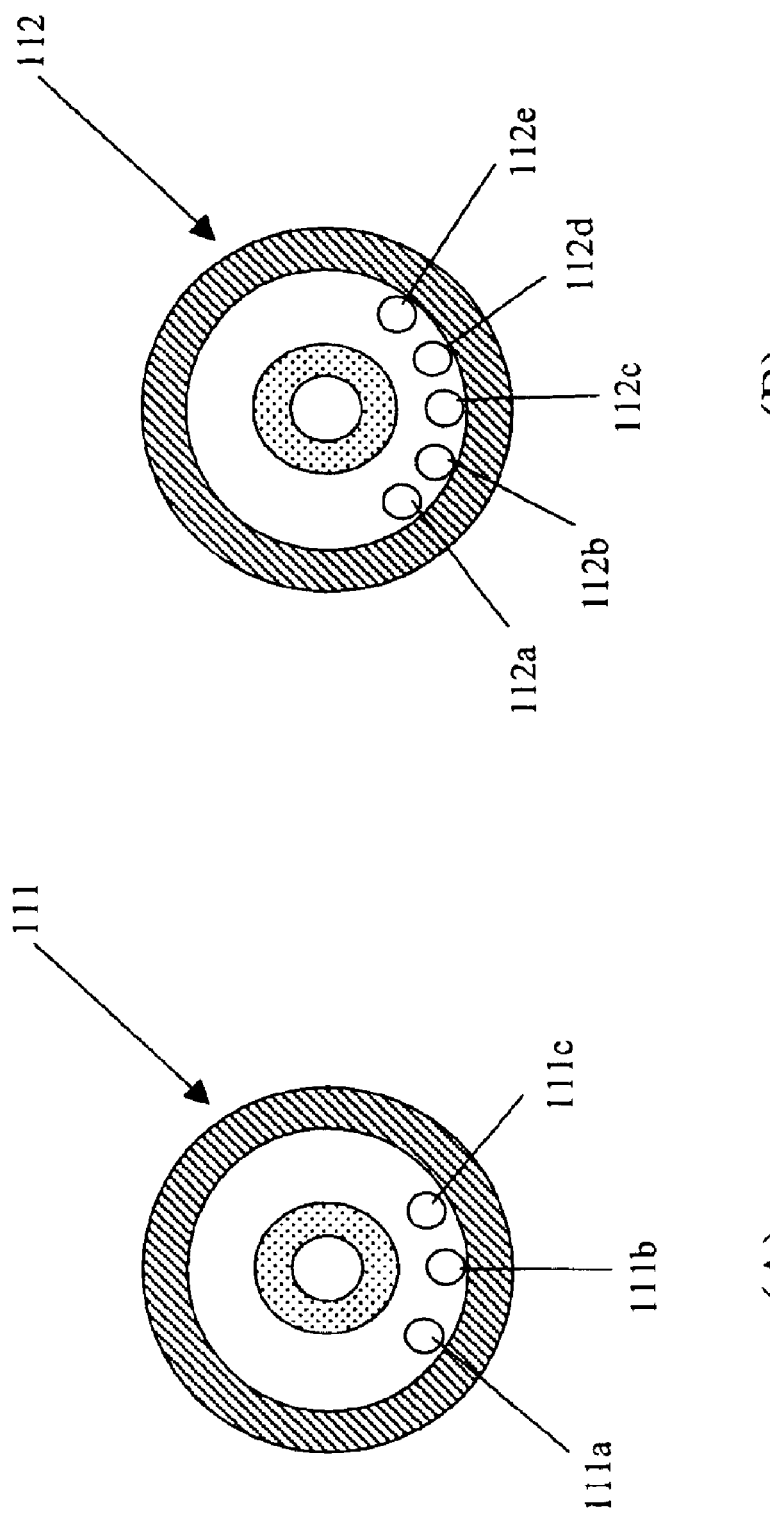
FIGS. 2A and 2B show examples of detector configurations.

FIG. 2A shows that the near neutron detector bank 111 (the near bank) as illustrated has three detectors 111a–111c displaced axially from the source. Although the neutron detectors typically comprise $^3$He neutron detector tubes, other types of neutron detectors are expressly within the scope of the invention. For example, the $^4$He proportional counters disclosed in U.S. Pat. No. 5,532,482 issued to Stephenson and assigned to the present assignee may be used to detect neutrons having energies higher than epithermal neutrons. FIG. 2B shows that the far detector bank 112 (the far bank) has five neutron detectors 112a–112e placed at a further axial distance from the source. One skilled in the art would appreciate that the numbers of detectors shown in FIGS. 2A and 2B are for illustration purpose only and other numbers of detectors may be used. As illustrated, all of the neutron detectors are located just inside the collar, i.e., on the periphery of the device instead of the center. One skilled in the art would appreciate that other eccentered configurations of the detectors are possible, for example, detectors in stabilizer blades. These eccentered configurations/arrangements are generally referred to as having the detectors located in the periphery of the tool, whether they are in the collar of the tool or outside the collar of the tool (e.g., in the stabilizer blades). The eccentered configuration provides the azimuthal sensitivity as discussed in more detail below. In addition, one or more of the detectors (e.g., the central detector 111b in the near bank 111) may be shielded (e.g., with cadmium) to render it insensitive to thermal neutrons so that it primarily responds to epithermal neutrons, while the unshielded detector tubes are mainly sensitive to thermal neutrons.

In order for the measurement data to have azimuthal information, the sensors used for the measurements must be sensitive to signals coming from a restricted azimuthal range. In other words, a sensor looking out into a borehole must not be able to "see" the entire borehole with equal sensitivity. Generally, this may be achieved by judicious placement of the sensors in the tool (e.g., the eccentered configuration as shown in FIGS. 2A and 2B), shielding either the source (if it is present) or the sensors, collimating the energy coming from the formation before it reaches the sensor, or a combination of these approaches. These approaches, and others known in the art, may be used alone or in combination to obtain the desired azimuthal sensitivity.

For example, FIGS. 2A and 2B show that the detectors in each bank (or detector group) are arranged around the periphery of the tool chassis and clustered in one region. This eccentered arrangement makes the tool more sensitive to the portion of the borehole closest to the detectors. That is, the detectors are more sensitive to signals coming from a particular azimuthal direction. FIGS. 2A and 2B show one example of an eccentered arrangement of the detectors. Other eccentered arrangements (e.g., placing the detectors in the stabilizer blades) may also be used to practice the present invention. In addition, the azimuthal sensitivity of each detector may be further improved by collimation, i.e., by placing shields to force each detector tube to detect signals coming from a particular azimuthal direction.

In a logging operation, neutrons may be emitted by the sources in the tool or originate from radioactive elements in the formation. The neutron sources in the tool may be a chemical source (e.g., AmBe) or a pulsed neutron generator, for example. Some neutrons emitted by the tool scatter off nuclei in the formation and migrate back to the detectors on the tool and are detected. The detected neutrons may be used to infer formation porosity, hydrogen index, slowing-down time, or sigma. Neutrons in the formation may slow down by losing energy through collisions (e.g., inelastic scattering) with nuclei in the formation and become epithermal and thermal neutrons. Thermal neutrons may be captured by nuclei in the formation. After neutron capture, the nuclei become "excited" and emit gamma rays as they return to the ground states. Because different nuclei emit gamma rays of different energy, gamma ray spectroscopy may be used to derive element ratios (elemental yields), which in turn can be used to infer lithology. Methods for determining formation lithology by gamma ray spectroscopy are well known in the art, see e.g., U.S. Pat. No. 5,440,118 issued to Roscoe and assigned to the same assignee of the present invention. Sigma is a measure of how fast thermal neutrons are captured. Thermal neutron capture process is typically dominated by chlorine. Therefore, formation sigma may be used to determine chlorine content or salinity of the formation. Alternatively, a comparison of thermal and epithermal neutron fluxes detected in the tool may be used for the same purpose. In addition, fast neutrons may scatter inelastically from nuclei in the formation and emit gamma rays which are characteristic of the nucleus by which the neutron was scattered. These gamma rays, once detected, could provide information about formation lithology and density.

As noted above, fast neutrons slow down by colliding with nuclei in the formation to become epithermal neutrons, which after further collision become thermal neutrons. Hydrogen, because it has a mass similar to that of a neutron, provides much more slowing of neutrons than do other atoms. Thus, the number of thermal neutrons detected in a borehole is related to the number of hydrogen atoms in the formation. Because water and hydrocarbons have similar hydrogen indices, and because the rock matrix of the formation is relatively free of hydrogen, the number of thermal neutrons in the borehole is related to the amount of hydrocarbons and water in the formation. In a non-gas bearing formation, the volume fraction of water and hydrocarbons with respect to the formation volume is called the neutron porosity. Neutron porosity is essentially a measurement of hydrogen density in the formation.

When a pulsed neutron generator is used, it is possible to separate the different interactions (e.g., inelastic scattering and neutron capture) in time after each neutron pulse. Inelastic and fast-neutron interactions occur during and very soon after each neutron pulse, while neutron capture events occur during and after, typically being measured much later. Therefore, if the pulsed neutron measurements are recorded as a function of burst timing, the resulting time and/or pulse height spectra of count rates may also be separated into an inelastic spectrum and a capture spectrum. Examples of measurements as a function of burst timing may be found in U.S. Pat. No. 5,440,118 issued to Roscoe, U.S. Pat. No. 6,032,102 issued to Wijeyesekera et al., U.S. Pat. No. RE 36,012 issued to Loomis et al., and U.S. application Ser. No. 09/929,680 filed by Robert A. Adolph on Aug. 14, 2001. These patents and application are assigned to the present assignee. In addition, in embodiments of the invention, the count rates in the neutron detectors or gamma sensors are recorded as a function of acquisition time. At a later stage, the acquisition time-based data can be converted to depth-based data using additional measurements made at the surface by procedures well known in the art. The tools according to the invention may also record measurement data with respect to the azimuthal position of the central (or any reference) detector as it is currently done. The azimuthal sensitivity of each individual detector can be enhanced later by associating count rates for each detector according to its azimuthal position, instead of the reference detector azimuthal position. This process is referred to as "detector de-phasing," which can be accomplished with software based on the angular displacement of each detector relative to a reference detector.

Alternatively, the azimuthal sensitivity of the detectors can be recorded by associating the count rates from each detector with its azimuthal position, instead of the azimuthal position of the reference detector (e.g., detector 111b in FIG. 2), when the count rates were recorded. One skilled in the art would appreciate that this may be achieved by simple modifications of the circuitry or software in the existing tools. This approach can alleviate the step of de-phasing.

Figure 3:
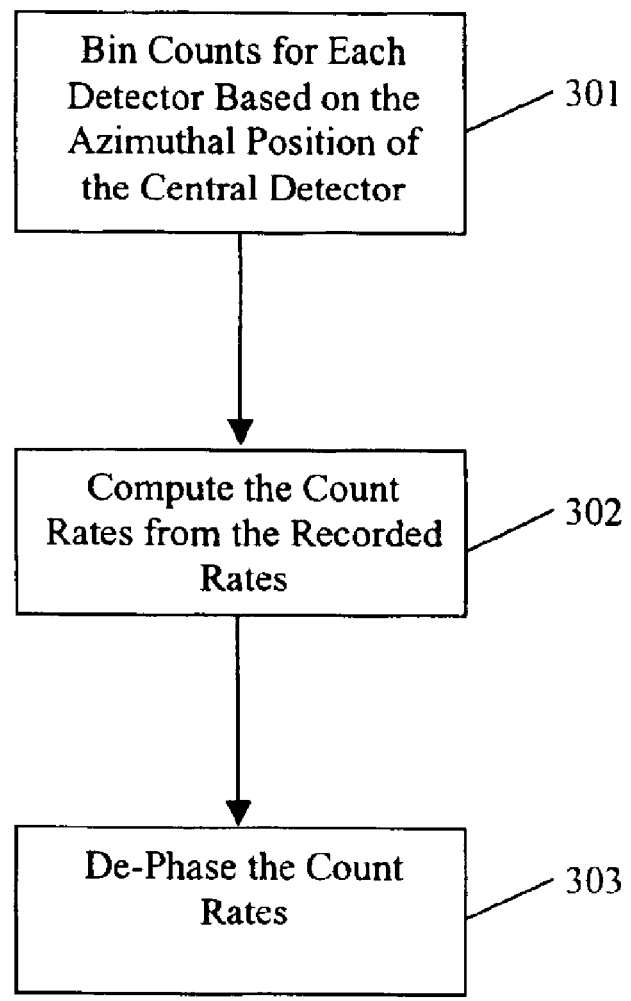
FIG. 3 a flow chart of a method according to one method of the invention.

FIG. 3 illustrates a method according to the invention for de-phasing the recorded data when the detector count rates are associated with the azimuthal position of the reference detector. The method is based on the fraction of time a particular detector spends in a particular azimuthal sector. First, the neutron data are collected and stored separately (binned) for each detector (step 301). Then, the count rates for each detector are computed from the record rates (step 302). Finally, the count rates for a particular detector t in sector $\alpha$ is computed based on the fraction of time detector t spends in that sector (step 303). This may be accomplished according to the following equation:

$$C_{\alpha t}^{Dephased} = \sum_{\beta} w_t^{\alpha\beta} C_{\beta t}^0, \qquad (1)$$

where $C_{\alpha t}^{Dephased}$ is a count rate for detector t when it is in sector $\alpha$, $C_{\beta t}^0$ is a count rate for detector t when the reference detector is in sector $\beta$, and $w_t^{\alpha\beta}$ is the fraction of time when the detector t is in sector $\beta$ and the reference detector is in sector $\alpha$. The method for de-phasing the count rates as shown in Equation (1) is an example. One skilled in the art would appreciate that other schemes (e.g., additional averaging and/or weighting of count rates from adjacent sectors after de-phasing according to Equation (1)) may be used to derive azimuthal sector data (count rates).

Figure 4:
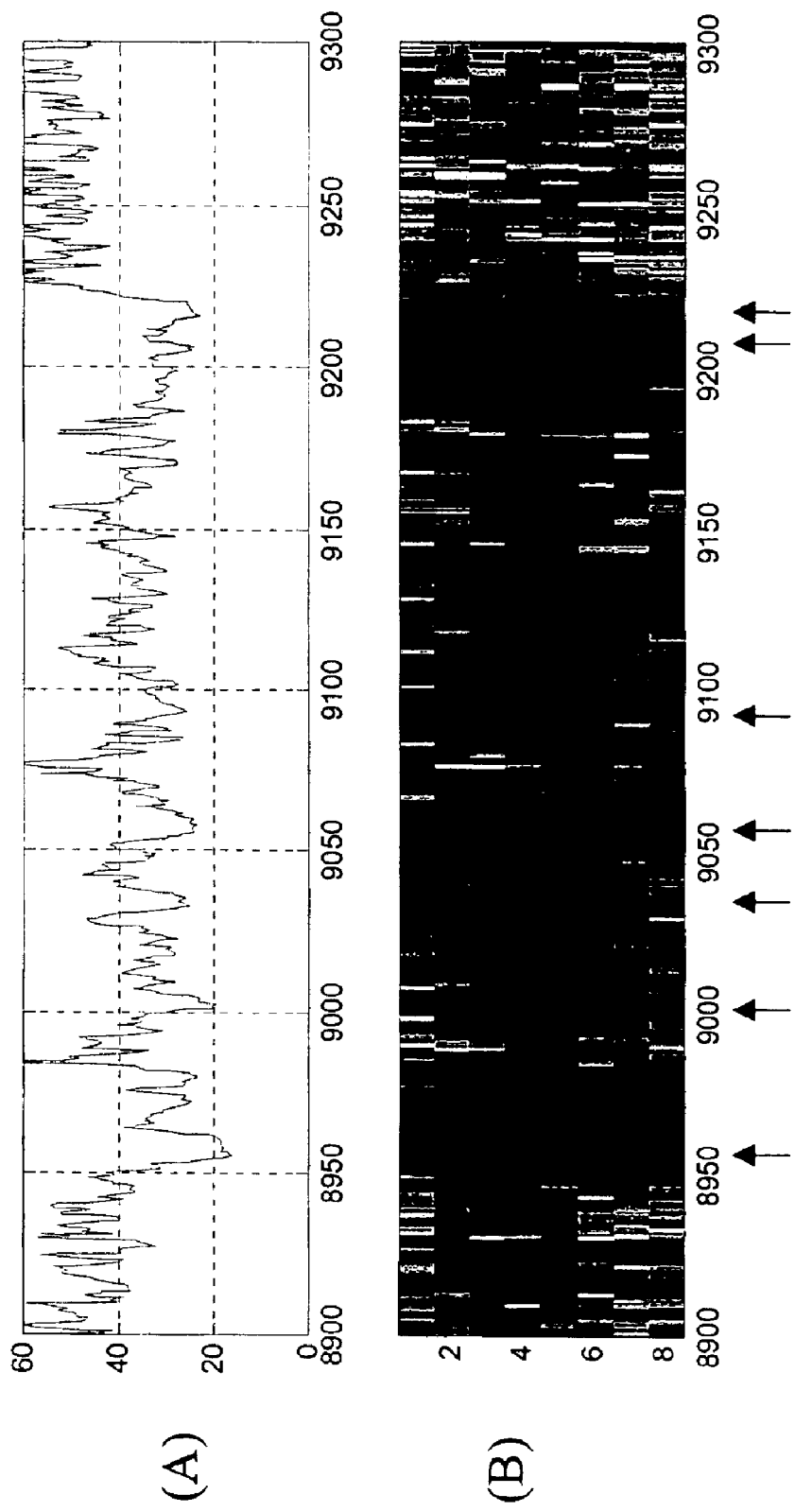
FIGS. 4A and 4B show results of azimuthal neutron logging according to one method of the invention.

Once the neutron data are de-phased, they can be used, for example, to select for sectors with better quality data, which are typically the "bottom" sectors. For example, FIG. 4A illustrates a result from a neutron logging followed by tube de-phasing as described above. FIG. 4A shows the porosity as a function of borehole depth based on average porosity of the bottom two sectors (out of eight sectors) for each depth. During a logging operation, the tool often rests against the bottom wall of the wellbore. Therefore, the bottom sectors are expected to be more representative of the true formation porosity than other sectors. This approach of selecting the bottom sectors provides a simple method for deriving better quality data from the azimuthal measurements.

Alternatively, other methods may be used to select better quality sector data, which may not be in the "bottom" sectors. For example, U.S. patent application Ser. No. 10/034,476, filed by Radtke et al. on Dec. 28, 2001, ("the Radtke et al. application") describes a method for tool-path identification in formation evaluation. This application is assigned to the same assignee as the present invention. The method first obtains measurements of formation properties in azimuthal sectors for each of a plurality of depth levels.

Quality factors are then calculated from the measurements and used to identify a centroid or maximum of the quality factors at each depth level. The centroids or maxima of the quality factors are then connected along the axis of a borehole to form the tool path. This tool path can be used to determine corrected measurements of formation properties by averaging measurements in the azimuthal sectors that are adjacent the tool path sectors.

In addition to providing data more representative of true formation properties, the de-phased data may also be used to provide information on drilling fluid properties. Ordinarily, one is interested in formation properties of a borehole. However, the properties of the drilling fluid also have many applications. For example, characterization of mud properties downhole may be used to detect gas kick and cuttings bed buildup. One example of this application is disclosed in U.S. patent application Ser. No. 09/960,445, filed by Gzara and Cooper on Sep. 21, 2001. This application is assigned to the present assignee.

Azimuthal sector data may be used to separate formation and mud effects. For example, Published U.S. patent application No. 2002/0096363 A1 by Evans et al. discloses a method for determining a characteristic of a mud mixture surrounding a drilling tool within a borehole in which a drilling tool is received. This application is assigned to the present assignee. The method includes defining a cross-section of the borehole which is orthogonal to a longitudinal axis of the borehole. A gravity vector relative to the cross-section of the borehole is determined. The cross-section is separated into at least two segments. One of the segments is called a bottom segment of the borehole, which includes the gravity vector. Measurement signals received from sectors other than the bottom sector typically include more effects from the drilling mud. An indication of characteristics of the drilling mud may then be derived from these signals. One may also combine the tool path identification method (the Radtke et al. application) described above with this method to derive mud properties from sectors that are not necessarily around the "top" sectors.

In addition to these applications, the more accurate azimuthally correlated data can provide formation properties that are not previously available from the conventional neutron measurements. For example, the de-phased neutron data may be used to image the formation, instead of simply providing the apparent porosity.

FIG. 4B shows an image of the formation based on porosity information in all eight sectors at each depth. In this figure, darker color indicates lower porosity. It is clear from this image that a dark, low porosity streak runs through the center (sectors 4 and 5) of the image. Sectors 4 and 5 correspond to the bottom two sectors. The dark streak in sectors 4 and 5 along the length of the borehole confirms that the data from the bottom two sectors are indeed more representative of the formation porosity as shown in FIG. 4A. In contrast, other sectors have more contributions from drilling fluids and show falsely high porosities. Data from these sectors may be used to characterize the properties of the drilling fluid. The formation image shown in FIG. 4B also shows that bedding planes can be clearly identified from the dark streaks (low porosity) running across all eight sectors at several places (as indicated by arrows).

Figure 5:
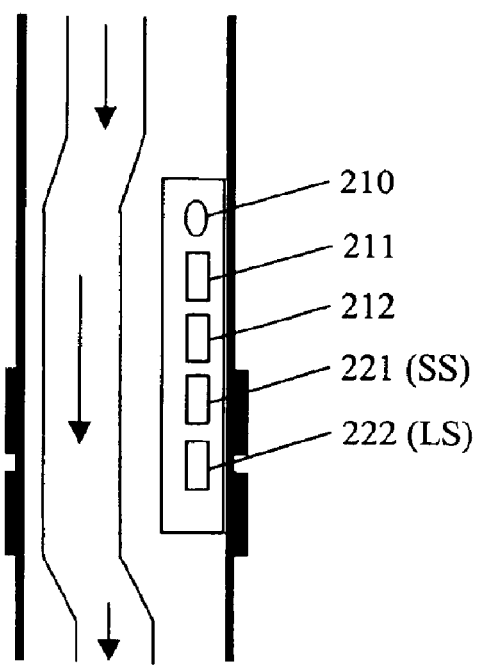
FIG. 5 shows a tool configuration according to another embodiment of the invention.

FIG. 1 illustrates one example of tool configurations. Other configurations may also be used for embodiments of the invention. For example, FIG. 5 illustrates another embodiments of a tool in which a pulsed neutron generator 210 provides the nuclear energy for both the neutron detectors 211 and 212, and the gamma ray detectors—the short spaced sensor (SS) 221 and the long spaced sensor (LS) 222. These detectors may be any of those known in the art for detecting neutron or gamma rays, such as $^3$He, $^4$He, LiF, GSO, NaI, BGO, GM, and CZT. A tool with such a configuration is described in Evans et al., "A Sourceless Alternative to Conventional LWD Nuclear Logging," paper SPE 62982, presented at the 2000 Society of Professional Engineers (SPE) Annual Technical Conference and Exhibition, Dallas, Tex., October 1–4. See also U.S. Pat. No. Re. 36,012, issued to Loomis et al and U.S. Pat. No. 5,804,820, issued to Evans et al. These patents are assigned to the present assignee.

Note that the pulsed neutron generator 210 and all detectors in this tool are eccentered, i.e., they are not located along the axis of the tool. When the tool rotates, the azimuthal position of the detectors sweeps around the borehole. The bulk of the tool and the eccentered location of both source and detectors make the measurements more sensitive to the portion of the borehole closest to the detectors. Some additional shielding may be disposed in the tool to enhance this azimuthal sensitivity (e.g., by collimators).

The pulsed-neutron generator 210 in this tool produces neutrons in a time controlled manner. Some of these neutrons interact with the formation, return to the tool, and are detected by the neutron detectors, while other neutrons interact with the formation and produce gamma rays, a portion of which return to the tool and are detected by the gamma ray detectors. As noted above, in addition to recording the neutron-induced signals as a function of neutron burst timing (time spectra), the count rates in each detector are also recorded as a function of acquisition time and the azimuthal position of the detector. In addition to the neutron data, gamma ray spectra may also be recorded. At a later stage, the time-based data can be converted to depth data using additional measurements made at the surface by procedures well known in the art.

Figure 6:
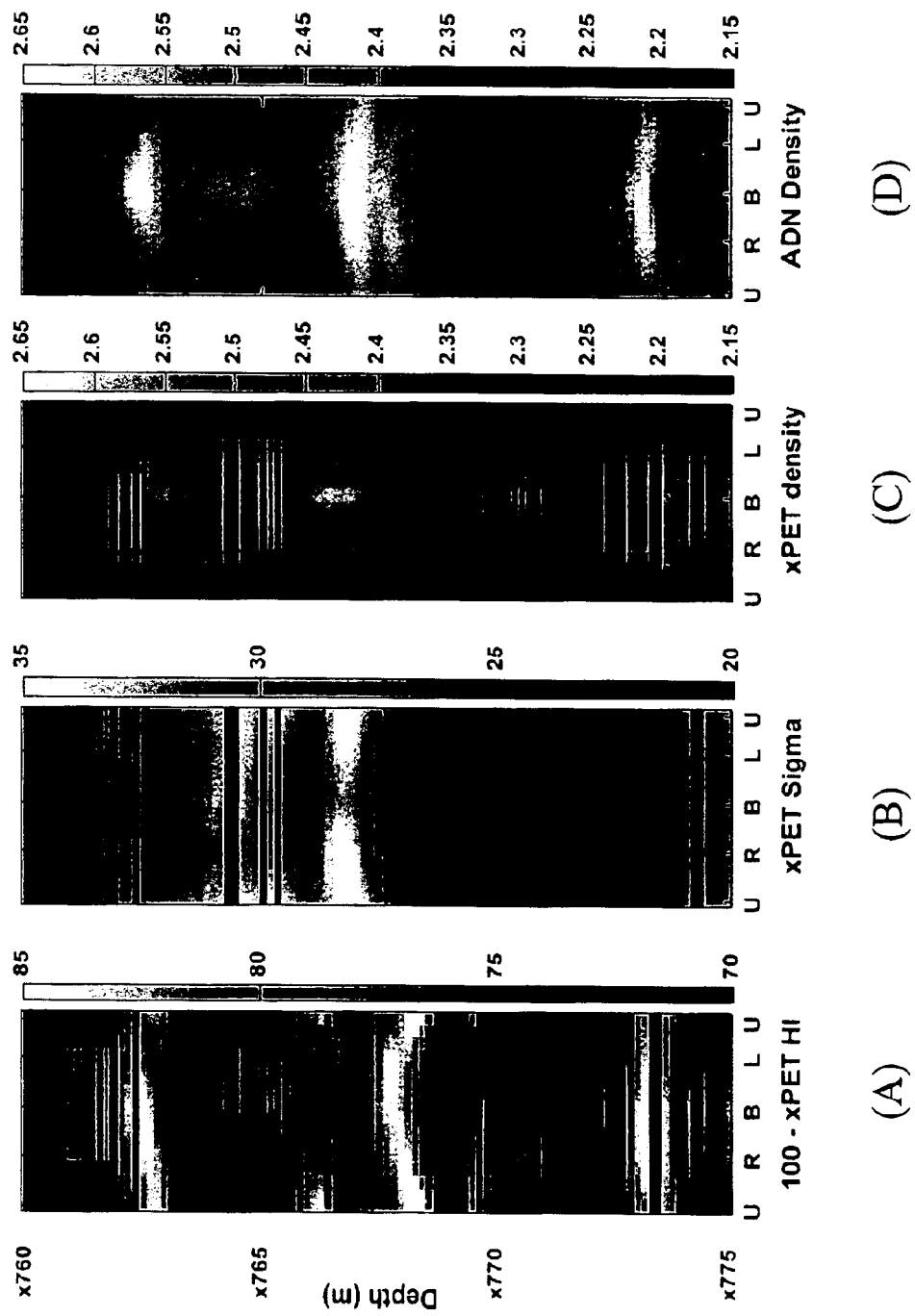
FIGS. 6A–6D show formation images derived from neutron measurements according to one method of the invention.

FIGS. 6A–6C show log examples of azimuthal neutron data obtained with the pulsed neutron tool of FIG. 5. Four sectors are shown for each graph—bottom sector (B), upper sector (U), right sector (R), and left sector (L). An azimuthal density image obtained from a stabilized ADN™ tool run in the same drill string is also shown for comparison (FIG. 6D).

It is clear that bedding planes and formation dips can be identified from the neutron images—from the "arc" stripes in the images. In particular, the formation features in the hydrogen index (HI) image (FIG. 6A) correspond closely with those seen in the ADN™ density image (FIG. 6D). Both FIGS. 6A and 6D exhibit clear indications of dip planes. The detailed formation information (e.g., bedding planes and dips) would not be possible using conventional neutron tools.

Several prior art methods may be used to further analyze formation dips using the azimuthal neutron data obtained with methods of the invention. For example, U.S. Pat. No. 6,307,199 issued to Edwards et al. discloses a method for determining a one-dimensional density corrected for stand-off and dipping beds penetrated by a borehole through an analysis of a two-dimensional image formed from combined depth and azimuthal measurements of density. Similarly, U.S. Pat. No. 5,299,128 issued to Antoine et al. discloses methods for analyzing borehole images and dip-picking based on a two-dimensional image of formation resistivity. U.S. Pat. No. 5,899,958 issued to Dowell et al. discloses a LWD acoustic tool for providing an image of the borehole during drilling or during removal of the tool from the borehole. The image may be used to identify the presence of bed boundaries intersecting the borehole. If a boundary is present, the imaging assembly applies a best fit sine wave to the image signal, from which dip angle and dip direction are obtained. These prior art methods may be applied to the azimuthal neutron data obtained with the methods of the invention for formation boundary identification and dip picking. The formation boundary information can be used to perform "geosteering" to control the drilling direction.

The Sigma measurement shown in FIG. 6B provides complementary information to the porosity and density, and so it is not expected to reproduce the features in those images exactly. The pulsed neutron density (PND) image shown in FIG. 6C reproduces the features of the ADN™ density image (FIG. 6D) on the bottom part of the borehole (bottom sectors) only. This indicates that the PND measurement in this tool, like the density measurement from other slick tools, is best when the tool is located near the formation. In deviated boreholes, the tool is generally but not always on the bottom. Often, the highest-quality measurements shift from the bottom due to motion of the tool in the borehole or the trajectory of the borehole itself. In these instances, the accuracy of the PND can be improved by selecting data from those sectors with the highest quality measurements, for example using the tool path method described above (the Radtke et al. application).

The forgoing examples illustrate two LWD tools in which the use of azimuthal neutron data can provide improvements in the accuracy of the neutron measurements and also provide images of earth formations. In addition, other information (e.g., formation dips and bedding planes), which is typically not available from conventional neutron logging, may be derived from the images.

It should be apparent to those skilled in the art that embodiments of the invention can be extended to other tools that currently exist and can be incorporated into the designs of future tools. In particular, utilizing shielding, collimation, and other methods known in the art, one can design tools to optimize their azimuthal neutron capabilities.

Advantageously, the present invention provides convenient methods for improving accuracy of neutron data binning with respect to azimuthal sectors. Having more accurate neutron data in each azimuthal sector, it is possible to select more presentative data from among the azimuthal sectors. In addition, the de-phased data may be used to provide an image of the formation. The formation image in turn makes it possible to obtain other information (e.g., dipping or bedding planes) that is otherwise unavailable. The ability to identify dipping and bedding planes makes it possible to use these methods in geosteering. The methods of the invention may be used with a wireline tool or an LWD/MWD tool. Furthermore, the neutron azimuthal data may be combined with other measurements to derive the desired formation properties.

For the purposes of this specification it will be clearly understood that the word "comprising" means "including but not limited to", and that the word "comprises" has a corresponding meaning.

What is claimed is:

1. A method for logging an earth formation penetrated by a wellbore, comprising:
   acquiring measurements of neutron-induced signals having azimuthal information using a neutron tool having at least one detector mounted thereon and disposed in the borehole;
   processing the acquired measurements into a plurality of azimuthal sector data for each acquisition interval;
   de-phasing the azimuthal sector data to associate count rates with the at least one detector according to a fraction of time the detector is in a particular azimuthal sector; and
   deriving a selected parameter associated with the formation, borehole, neutron tool, or neutron-induced signals using the de-phased data.

2. The method of claim 1, wherein the neutron tool is one selected from the group consisting of a wireline tool, a logging-while-tripping tool, a logging-while-drilling tool, and a measurement-while-drilling tool.

3. The method of claim 1, wherein the acquiring is performed by separately storing count rates detected by each of the at least one detector.

4. The method of claim 3, wherein the acquiring is performed as a function of time.

5. The method of claim 4, wherein the time comprises at least one selected from the group consisting of a neutron burst time and an acquisition time.

6. The method of claim 3, wherein the processing the measurements uses the count rates detected by each at least one detector.

7. The method of claim 1, wherein the time the at least one detector is in a particular azimuthal sector relates to a time selected from the group consisting of a neutron burst time and an acquisition time.

8. The method of claim 1, wherein the de-phasing the azimuthal sector data is according to the equation $$C_{\alpha t}^{Dephased} = \sum_{\beta} w_t^{\alpha\beta} C_{\beta t}^0,$$

where $C_{\alpha t}^{Dephased}$ is a count rate for detector t when it is in sector $\alpha$, $C_{\beta t}^0$ is a count rate for the detector t when a reference detector is in sector $\beta$, and $w_t^{\alpha\beta}$ is a fraction of time when the detector t is in the sector $\beta$ and the reference detector is in the sector $\alpha$.

9. The method of claim 1, wherein the neutron tool comprises one neutron source selected from the group consisting of a chemical neutron source and a pulsed neutron generator.

10. The method of claim 1, wherein the selected parameter comprises one selected from the group consisting of porosity, hydrogen index, sigma, pulsed neutron density, slowing-down time, spectroscopy, formation image, borehole image, and salinity.

11. The method of claim 1, further comprising generating an image of the earth formation from the selected parameter.

12. The method of claim 11, further comprising identifying a formation dip from the image.

13. The method of claim 11, further comprising identifying a formation boundary.

14. The method of claim 11, wherein the neutron tool is a logging-while-drilling tool and information of the image is used to control a drilling direction.

15. The method of claim 1, further comprising using an additional formation measurement selected from the group consisting of resistivity measurements, electromagnetic induction measurements, electromagnetic propagation measurements, ultrasonic measurements, acoustic measurements, natural gamma ray measurements, and gamma density measurements.

16. A neutron logging tool, comprising;
   a housing adapted to move in a borehole;
   a neutron source disposed in the housing;
   at least one detector adapted to detect neutron-induced signals disposed in the housing such that the detector is more sensitive to signals from an azimuthal direction and spaced apart from the neutron source;
   a processor adapted to process the detected signals into a plurality of azimuthal sector data; and the processor adapted to de-phase the azimuthal sector data to associate count rates with the at least one detector according to a fraction of time the detector is in a particular azimuthal sector in the borehole.

17. The tool of claim 16, wherein the neutron source is a chemical neutron source or a pulsed neutron generator.

18. The tool of claim 16, wherein the neutron tool is part of a tool selected from the group consisting of a wireline tool, a logging-while-tripping tool, a logging-while-drilling tool, and a measurement-while-drilling tool.

19. The tool of claim 16, wherein the at least one detector is arranged in an eccentered configuration.

20. The tool of claim 16, wherein the at least one detector is shielded, collimated, or shielded and collimated to improve azimuthal sensitivity.

21. The tool of claim 16, wherein the time the at least one detector is in a particular azimuthal sector relates to a time selected from the group consisting of a neutron burst time and an acquisition time.

22. The tool of claim 16, wherein the processor is adapted to de-phase the azimuthal sector data according to the equation $$C_{\alpha t}^{Dephased} = \sum_{\beta} w_t^{\alpha\beta} C_{\beta t}^0,$$

where $C_{At}^{Dephase}$ is a count rate for tube t when it is in sector $\alpha$, $C_{\beta t}^0$ is a count rate for the detector t when a reference detector is in sector $\beta$, and $w_t^{\alpha\beta}$ is a fraction of time when the detector t is in the sector $\beta$ and the reference detector is in the sector $\alpha$.

23. The tool of claim 16, wherein the processor is adapted to generate an image of an earth formation from the count rates.

* * * * *